(12) United States Patent
Degawa et al.

(10) Patent No.: US 11,855,318 B2
(45) Date of Patent: Dec. 26, 2023

(54) FUEL BATTERY CELL, FUEL BATTERY SYSTEM, LEAK DETECTION METHOD

(71) Applicant: HITACHI HIGH-TECH CORPORATION, Tokyo (JP)

(72) Inventors: Munenori Degawa, Tokyo (JP); Noriyuki Sakuma, Tokyo (JP); Yoshitaka Sasago, Tokyo (JP); Aritoshi Sugimoto, Tokyo (JP); Nobuyuki Mise, Tokyo (JP); Takashi Tsutsumi, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 179 days.

(21) Appl. No.: 17/601,593

(22) PCT Filed: Apr. 26, 2019

(86) PCT No.: PCT/JP2019/017980
§ 371 (c)(1),
(2) Date: Oct. 5, 2021

(87) PCT Pub. No.: WO2020/217467
PCT Pub. Date: Oct. 29, 2020

(65) Prior Publication Data
US 2022/0181658 A1    Jun. 9, 2022

(51) Int. Cl.
*H01M 8/04664*    (2016.01)
*H01M 8/04537*    (2016.01)
(Continued)

(52) U.S. Cl.
CPC ... *H01M 8/04671* (2013.01); *H01M 8/04552* (2013.01); *H01M 8/1226* (2013.01); *H01M 8/1286* (2013.01)

(58) Field of Classification Search
CPC ....... H01M 8/02; H01M 8/0271–0286; H01M 8/04; H01M 8/04298; H01M 8/04313;
(Continued)

(56) References Cited

U.S. PATENT DOCUMENTS 6,156,447 A * 12/2000 Bette ................. H01M 8/04089
429/432
2002/0155335 A1    10/2002 Kearl
(Continued)

FOREIGN PATENT DOCUMENTS

EP    1294039 A1 *  3/2003    ......... H01M 4/8807
JP    2003-346817 A    12/2003
(Continued)

OTHER PUBLICATIONS

Extended European Search Report dated Nov. 8, 2022 for European Patent Application No. 19925777.5.
(Continued)

*Primary Examiner* — Jonathan Crepeau
*Assistant Examiner* — Jacob Buchanan
(74) *Attorney, Agent, or Firm* — Volpe Koenig

(57) ABSTRACT

The present invention aims to provide a fuel battery system improved in reliability by accurately detecting when a fuel electrode gas or an air electrode gas has leaked. A fuel battery cell according to the present invention includes a first electrode, an electrolyte membrane, and a second electrode which are layered on a support substrate. Further, at least any one of the first electrode, the electrolyte membrane, and the second electrode is electrically isolated by an insulating member to form a first region and a second region. The insulating member is disposed at a position where the insulating member does not overlap with an opening portion of the support substrate (refer to FIG. 3).

13 Claims, 17 Drawing Sheets

(51) Int. Cl.
*H01M 8/1226* (2016.01)
*H01M 8/1286* (2016.01)

(58) Field of Classification Search
CPC .......................... H01M 8/0438–04485; H01M 8/04537–04567; H01M 8/04664–04679; H01M 8/04694; H01M 8/04746–0482; H01M 8/04858–0488; H01M 8/1097–1286; H01M 8/24–2435; H01M 8/2465
See application file for complete search history.

(56) References Cited

U.S. PATENT DOCUMENTS

| | | |
|---|---|---|
| 2010/0206455 A1 | 8/2010 | Uchiyama |
| 2012/0021330 A1 | 1/2012 | Kobayashi et al. |
| 2013/0052549 A1 | 2/2013 | Mizuhata et al. |
| 2013/0202981 A1* | 8/2013 | Liu .................... H01M 8/2404 429/535 |
| 2018/0145360 A1 | 5/2018 | Devoe et al. |

FOREIGN PATENT DOCUMENTS

| | | |
|---|---|---|
| JP | 2005-500647 A | 1/2005 |
| JP | 2009-014649 A | 1/2009 |

OTHER PUBLICATIONS

Chinese Office Action dated Jun. 15, 2023 for Chinese Patent Application No. 201980095297.5.

* cited by examiner

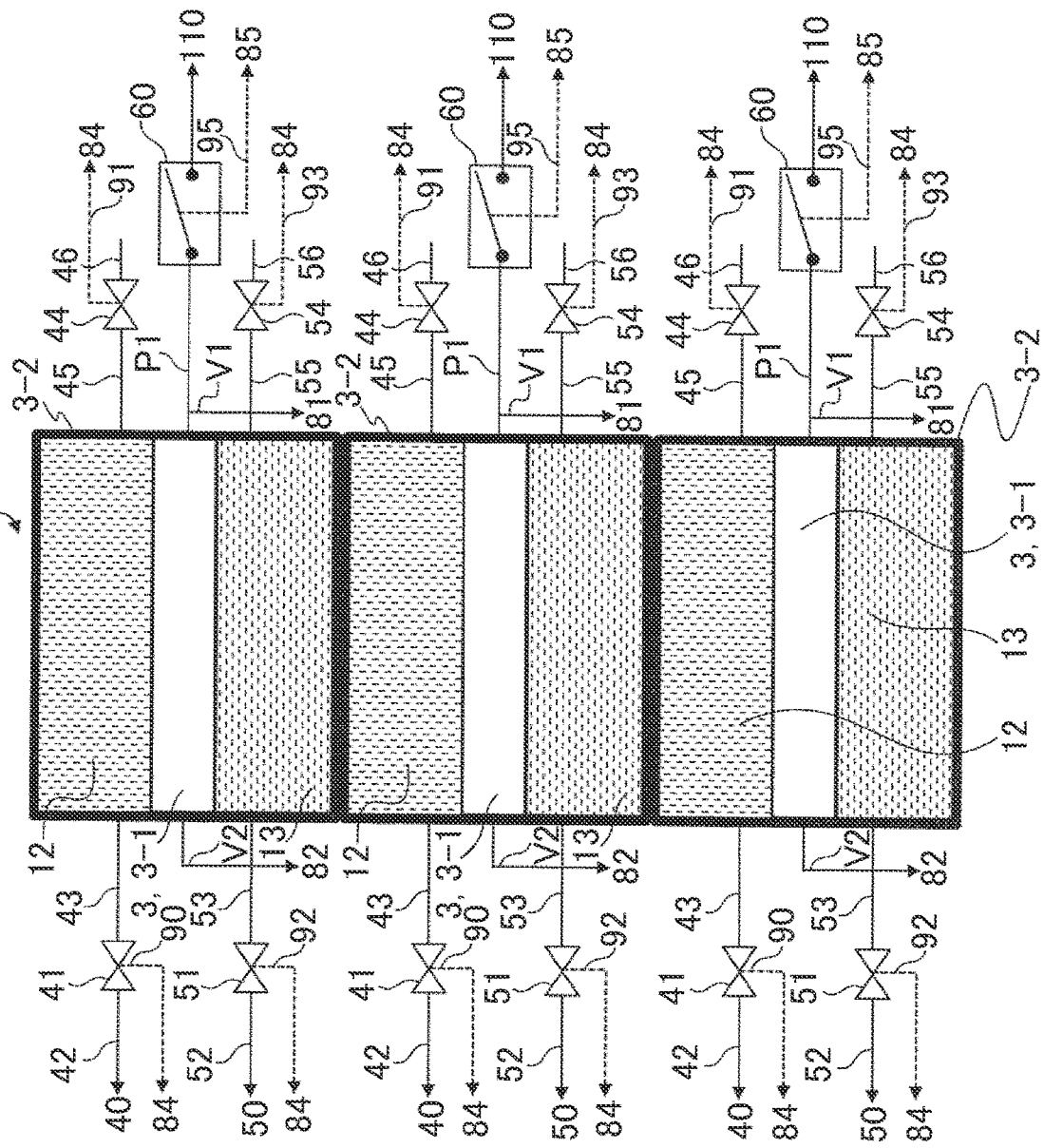

FUEL BATTERY CELL, FUEL BATTERY SYSTEM, LEAK DETECTION METHOD

TECHNICAL FIELD

The present invention relates to a fuel battery.

BACKGROUND ART

In recent years, a fuel battery has been attracting attention as a clean energy source capable of high energy conversion and not emitting pollutants such as carbon dioxide and nitrogen oxides. In particular, a system using a solid electrolyte in a fuel battery cell is capable of using as fuel, gases such as hydrogen, methane, and carbon monoxide, which are high in power generation efficiency and easy to handle. Therefore, the system has been expected as a cogeneration system having many advantages as compared with other methods and excellent in energy saving and environmental properties.

The solid electrolyte type fuel battery cell has a structure in which the solid electrolyte is sandwiched between a fuel electrode and an air electrode. The fuel battery cell uses the electrolyte as a partition wall, supplies a fuel gas such as hydrogen to the fuel electrode side and supplies air or an oxygen gas to the oxygen station side. As the solid electrolyte type fuel battery cell, there are several types of solid electrolyte type fuel battery cells. There has been described in, for example, the following Patent Literature 1, a solid electrolyte type fuel battery cell capable of operation at a low temperature (700° C. or less), in which an electrolyte is made thin to compensate for low conductivity of the electrolyte, a through window is formed in a single crystal silicon substrate, and a fuel electrode, an electrolyte, and an air electrode are laminated on the through window.

The following Patent Literature 1 discloses a configuration in which "the illustrated fuel battery cell is provided with a substrate 4 and has the above-described three-layer structure in a state in which an insulating layer 5 is provided on the substrate 4, a through window 6 is formed, and the through window 6 is closed. Further, a fuel electrode 2 and an air electrode 3 respectively have lattice-shaped frame electrodes 2B and 3B that form an opening 7 from which the surface of an electrolyte 1 is exposed, as current collecting electrodes for collecting current in a region corresponding to the through window 6, and granular electrodes 2A and 3A are provided in the opening 7." (refer to paragraph 0026).

CITATION LIST

Patent Literature

PTL 1: Japanese Patent Application Laid-Open No. 2003-346817

SUMMARY OF INVENTION

Technical Problem

In a fuel battery cell having an opening as in Patent Literature 1, an electrolyte membrane is supported by a substrate on both sides of the opening. Therefore, it is vulnerable to residual stress during processing, thermal stress during operation, a difference in pressure between the gas at a fuel electrode and the gas at an air electrode, and the like. Consequently, the electrolyte membrane may be destroyed when an unexpected change occurs.

When the electrolyte membrane is destroyed, the gas at the fuel electrode or the gas at the air electrode leaks to the other electrode through the destroyed portion, and these gases are mixed. Consequently, the power generation output of the cell in which the leak has occurred is reduced. When the mixed gas can be input to other cells, the power generation output of the other cells will decrease as well. Further, when the electrode of the fuel electrode and the electrode of the air electrode come into contact with each other due to the destruction, the power generation output of other cells connected to the corresponding cell also decreases. Incidentally, the destruction may be extended at once or may be extended over time, and the amount of decrease in power generation output also differs depending on the state of destruction.

The present invention has been made in view of the above-described problems and aims to provide a fuel battery system improved in reliability by accurately detecting when a fuel electrode gas or an air electrode gas leaks.

Solution to Problem

In a fuel battery cell according to the present invention, a first electrode, an electrolyte membrane, and a second electrode are laminated on a support substrate, and at least one of the first electrode, the electrolyte membrane, and the second electrode is electrically separated by an insulating member to form a first region and a second region. The insulating member is arranged at a position not overlapping with an opening of the support substrate.

Advantageous Effects of Invention

According to the fuel battery cell according to the present invention, the destruction of the electrolyte membrane at the opening can be detected with a simple configuration. Consequently, for example, a pressure gauge or a flow meter for leak detection becomes unnecessary, so that the energy required for the leak detection can be suppressed. Further, since a sensing unit for the leak detection can be built in the fuel battery cell, it is also easy to reduce the size of the sensing unit and install a plurality of sensing units in the fuel battery cell.

BRIEF DESCRIPTION OF DRAWINGS

FIG. 17 is a configuration diagram of a fuel battery stack 2-1.

DESCRIPTION OF EMBODIMENTS

First Embodiment

Figure 1:
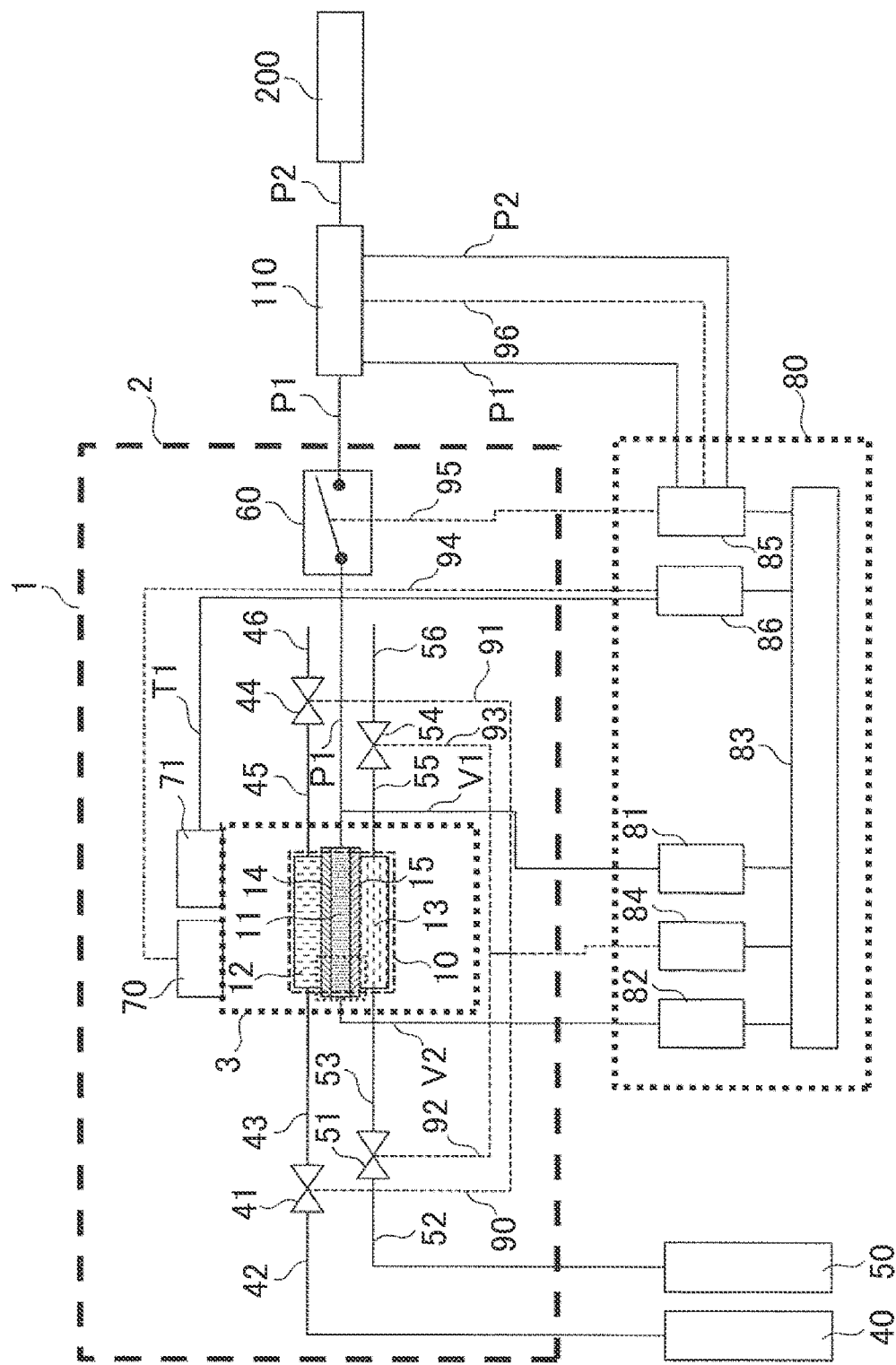
FIG. 1 is an overall configuration diagram of a fuel battery system 1 according to a first embodiment.

FIG. 1 is an overall configuration diagram of a fuel battery system 1 according to a first embodiment of the present invention. As shown in FIG. 1, the fuel battery system 1 is a system which converts a fuel gas 40 and an oxidizing agent 50 into power P1 by subjecting them to an oxidation-reduction reaction in the fuel battery stack 2, adjusts the voltage and the amount of suppliable current in a power adjusting unit 119, and supplies power P2 to a load 200 which uses electricity as energy. The fuel battery system 1 includes at least one fuel battery stack 2.

The fuel battery cell 3 is divided into spaces 12 and 13 via an electrolyte 11. The electrolyte 11 can be made of, for example, a solid oxide to be described later. The fuel gas 40 is supplied to either one of the spaces 12 and 13, the oxidizing agent 50 is supplied to the other, and the fuel battery cell 3 is placed under a temperature T1 of 300 to 700 degrees by a heater 70. Consequently, ions are generated by the oxidation-reduction reaction in the electrolyte 11. The ions are conducted between an electrode 14 on one surface of the electrolyte 11 and an electrode 15 on the other surface thereof via the electrolyte 11, so that the power P1 is obtained. A voltage V1 is obtained by the oxidation-reduction reaction in the electrolyte 11 during the normal condition. When the electrolyte 11 is destroyed, a voltage V2 can be obtained via a destruction detection unit 5 to be described later.

The fuel gas 40 is supplied to the space 12 of the fuel battery stack 2 via a flow path 43/valve 41/flow path 42. The unreacted fuel gas and reactive organisms are discharged via a flow path 45/valve 44/flow path 46. Examples of the fuel gas 40 include a hydrogen gas and a natural gas, for example.

The oxidizing agent 50 is supplied to the space 13 of the fuel battery stack 2 via a flow path 53/valve 51/flow path 52. The unreacted oxidizing agent and reactive organisms are discharged via a flow path 55/valve 54/flow path 56. Examples of the oxidizing agent 50 include an oxygen gas and air, for example. When air in the atmosphere is used, the valves 51 and 54 may be omitted because it will not run out of supply.

The discharged fuel gas 40 and the oxidizing agent 50 may be resupplied to the fuel battery cell 3 or may be supplied to another fuel battery cell 3. Consequently, it is possible to improve the efficiency of use of the fuel gas 40 and the oxidizing agent 50.

The control unit 80 is a functional unit which controls the operation of the fuel battery system 1, and executes monitoring and control of the temperature of the fuel battery stack 2, the input/output of the fuel gas 40 and the oxidizing agent 50, and the power P1, etc. The control unit 80 includes voltage measuring parts 81 and 82, a calculation part 83, a gas control part 84, a power control part 85, and a temperature control part 86.

The voltage measuring part 81 measures the voltage V1 generated in the fuel battery cell 3, and the voltage measuring part 82 measures the voltage V2 generated in the destruction detection unit 5 of the fuel battery cell 3. The gas control part 84 controls the input/output of the fuel gas 40 and the oxidizing agent 50 to the fuel battery cell 3 by controlling the valves 41, 44, 51, and 54 by signals 90, 91, 92, and 93, respectively. The temperature control part 86 controls the heater 70 in the vicinity of the cell via a signal 94 and controls the temperature T1 of the fuel battery cell 3 by measuring the temperature through a thermometer 71. The power control part 85 on/off-controls the output of the power P1 by controlling a switch 60 via a signal 95, and controls a power adjustment unit 110 via a signal 96. By executing control calculations using these measured values and control values, the calculation part 83 grasps the operating state of the fuel battery system 1 and controls each functional unit so as to achieve the optimum operating state.

The power adjusting unit 110 adjusts the voltage and the amount of suppliable current with respect to the power P1 output from the fuel battery cell 3, and supplies power to the load 200 as the power P2. The power adjusting unit 110 controls a voltage value by control of the number of series-connections of the fuel battery cells 3 and transformation by a transformer. Examples of the transformer include a DC-DC converter, an inverter, and the like. An appropriate combination can be adopted according to the specifications of the load 200. The power adjusting unit 110 controls the amount of current by controlling the number of parallel connections of the fuel battery cells 3.

In these controls, the characteristics of the fuel battery cell 3 may be adjusted. In that case, the gas control part 84 may control the supply amounts of the fuel gas 40 and the oxidizing agent 50 by a valve control amount, and the temperature control part 86 may adjust the temperature of the fuel battery cell 3. Further, as will be described later, a part of the fuel battery cell 3 may be electrically disconnected from the fuel battery system 1 or the disconnected fuel battery cell 3 may be reconnected.

Figure 2:
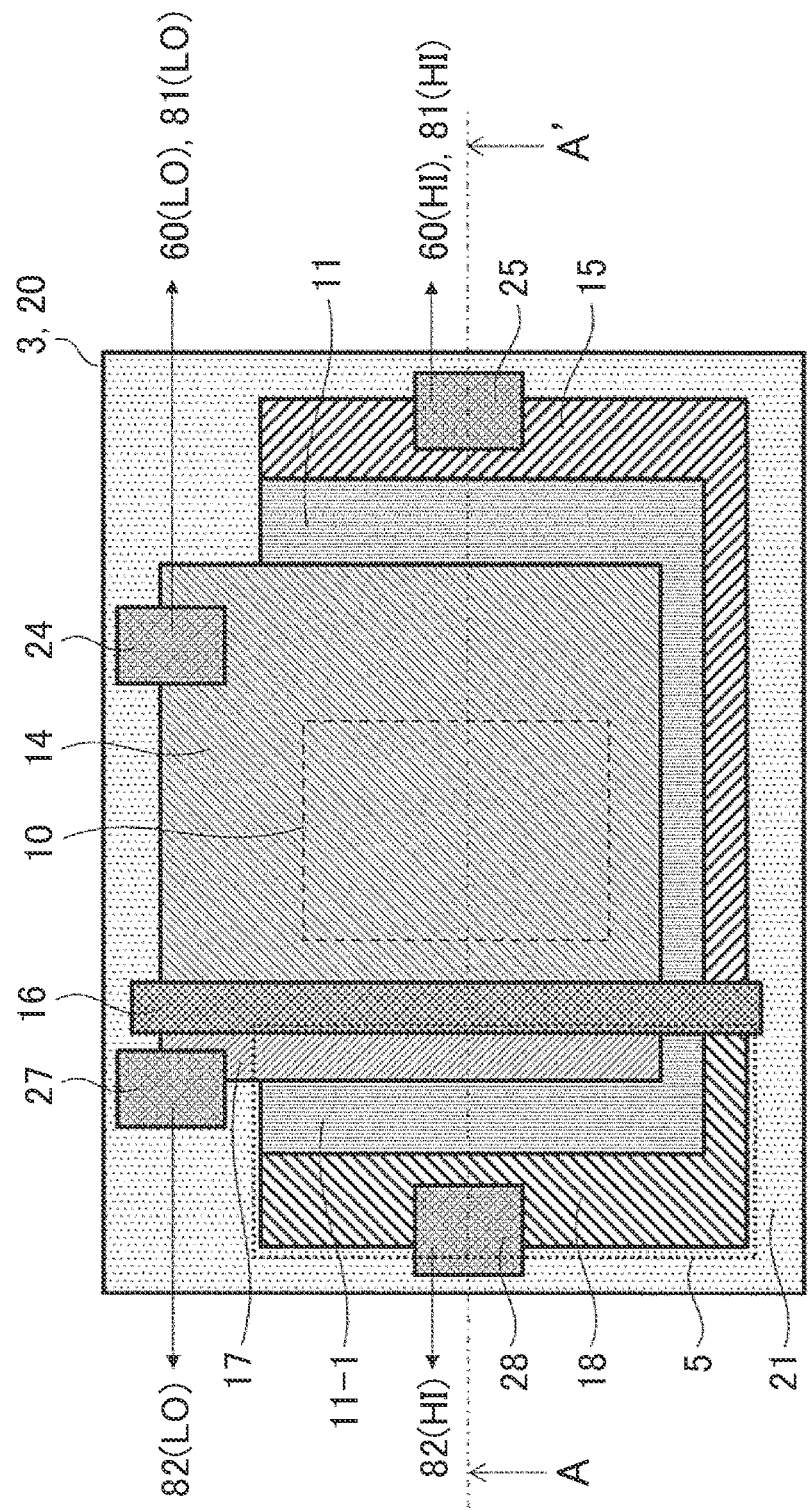
FIG. 2 is a plan view of a fuel battery cell 3.

FIG. 2 is a plan view of the fuel battery cell 3. The fuel battery cell 3 can be produced by using a semiconductor process, for example. An insulator 21 is formed on a substrate 20. An electrode 15 and an electrode 18 are formed on the insulator 21. An electrolyte 11 is formed on the electrode 15, and an electrolyte 11-1 is formed on the electrode 18. An electrode 14 is formed on the electrolyte 11, and an electrode 17 is formed on the electrolyte 11-1. The electrode 15 and the electrode 18 are electrically separated via an insulator 16. The electrolyte 11 and the electrolyte 11-1 are electrically separated via the insulator 16. The electrode 14 and the electrode 17 are electrically separated via the insulator 16.

An electrode pad 24 is electrically connected to the LO side of the switch 60 and the LO side of the voltage measuring part 81. An electrode pad 25 is electrically connected to the HI side of the switch 60 and the HI side of the voltage measuring part 81. An electrode pad 27 is electrically connected to the LO side of the voltage measuring part 82. An electrode pad 28 is electrically connected to the HI side of the voltage measuring part 82. An opening 10 and the destruction detection unit 5 will be described later. The electrodes 14, 15, 17, and 18 are electrically connected to the electrode pads 24, 25, 27, and 28, respectively. The electrode pads 24 and 25 output a voltage in the right region (first region) of the insulator 16 in FIG. 2 (first voltage output unit). The electrode pads 27 and 28 output a voltage in the left region (second region) of the insulator 16 in FIG. 2 (second voltage output unit).

Figure 3:
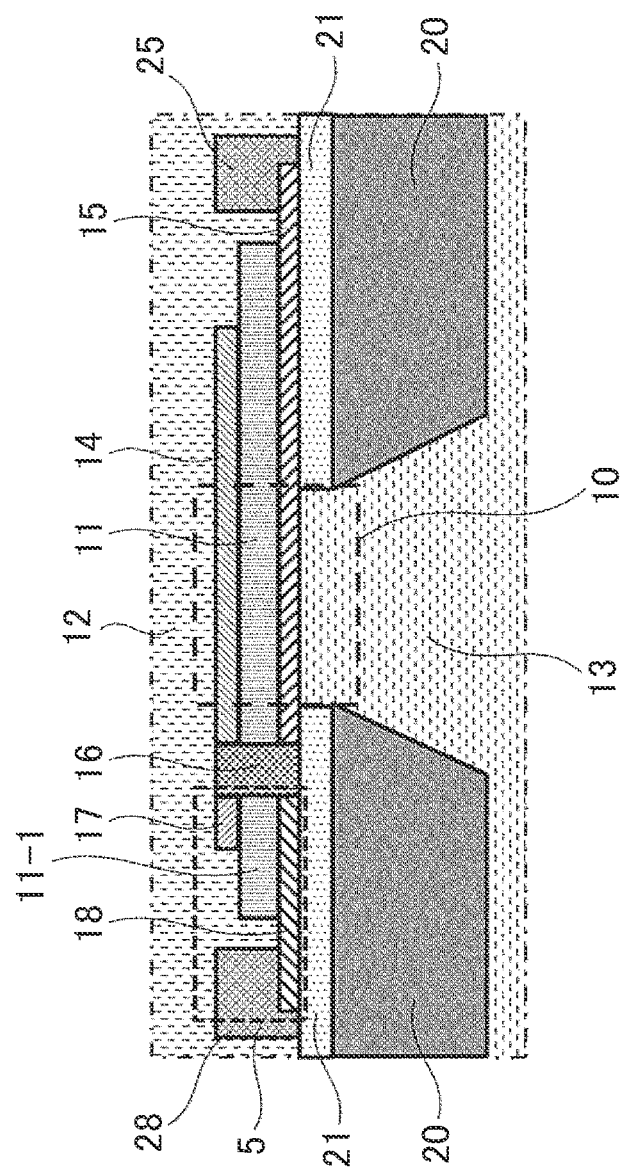
FIG. 3 is a cross-sectional view taken along line A-A' of FIG. 2.

FIG. 3 is a cross-sectional view taken along line A-A' of FIG. 2. The opening 10 having a size of 1 mm square or less is provided in parts of the insulator 21 and the substrate 20 by etching. The electrode 15, the electrolyte 11, and the electrode 14 are arranged at positions where they overlap with the opening 10. The electrode 18, the electrolyte 11-1, the electrode 17, and the insulator 16 are arranged at positions where they do not overlap with the opening 10. The electrode 15 is in contact with the space 13 via the opening 10. The electrodes 14 and 17 are in contact with the space 12. The space 12 and the space 13 are spatially isolated so that the gas does not conduct from one of the spaces to the other.

The destruction detection unit 5 is comprised of the electrode 18, the electrolyte 11-1, and the electrode 17. The destruction detection unit 5 is arranged on the space 12 side and at a position where it does not overlap with the opening 10 (not directly above the opening 10). In other words, the destruction detection unit 5 is formed by electrically separating the electrodes 15 and 18, the electrolytes 11 and 11-1, and the electrodes 14 and 17 from each other by the insulator 16.

For example, silicon (Si) is used as the material of the substrate 20, and has a thickness of 400 micrometers or more. As the material for the insulator 21 and the insulator 16, for example, silicon nitride (SiN) is used, formed by a CVD method, and has a thickness of about 200 nanometers.

As the electrolyte 11, an oxide ion conductor or a proton conductor is used. Examples of the oxide ion conductor include yttria-stabilized zirconia (YSZ), scandia-stabilized zirconia, lanthanum gallate, etc. The proton conductor includes, for example, perovskite-type oxides. In the case of a YSZ film, it is formed to a thickness of 500 nanometers or less by using a sputtering method.

The electrodes 14, 15, 17, and 18 are formed to a thickness of 100 nanometers or less by using the sputtering method or the like. It is desirable that each of the electrodes is a membrane large in grain boundary (preferably, the grain boundaries are open to the surface where the electrolyte 11 and the space 12 are in contact with each other, and the surface where the electrolyte 11 and the space 13 are in contact with each other, and have columnar crystals), and higher in melting point than an operating temperature (for example, 900° C. or above). Examples of such a membrane include platinum (Pt), a silver film (Ag), a nickel film (Ni), a chromium film (Cr), a palladium film (Pd), a ruthenium film (Ru), a rhodium film (Rh), and the like. When a corrosive gas is contained in the fuel gas 40 or the oxidizing agent 50, a conductive compound material such as a titanium nitride film (TiN), a tungsten nitride film (WN), a molybdenum nitride film (MoN), a hafnium nitride film (HfN), tantalum nitride (TaN), or the like may be used.

The electrode pads 24, 25, 27, and 28 are formed to a thickness of 100 nanometers or more by using the sputtering method or the like and are electrically connected to the outside of the fuel battery cell 3 as described above. At the time of this connection, a load such as weighting or an ultrasonic wave may be applied to the connection portion of the electrode pads. It is therefore desirable that from the viewpoint of preventing the electrolyte 11 from being destroyed, the electrolyte 11 does not exist directly under each electrode pad. On the other hand, portions other than the portion where each electrode pad and the outside of the fuel battery cell 3 are connected may be in contact with the electrodes 14, 17, 15, and 18 as a whole, respectively. In this case, by forming the electrode pads in a mesh shape, the gas in the space 12 or 13 can be brought into contact with the electrodes 14, 15, 17, and 18, respectively. As the material for the electrode pads 24, 25, 27, and 28, a metal low in resistivity is desirable, and a gold film (Au), a silver film (Ag), etc. can be used. In addition, a molybdenum film (Mo), a tungsten film (W), a tantalum film (Ta), a hafnium film (Hf), a silicon film containing impurities, etc., which are high melting-point metals, may be used. When the fuel battery cell 3 is used at the low temperature operation of 450° C. or less, a gold film (Au), a silver film (Ag), an aluminum film (Al), a copper film (Cu), carbon (C), or the like may be used.

Figure 4:
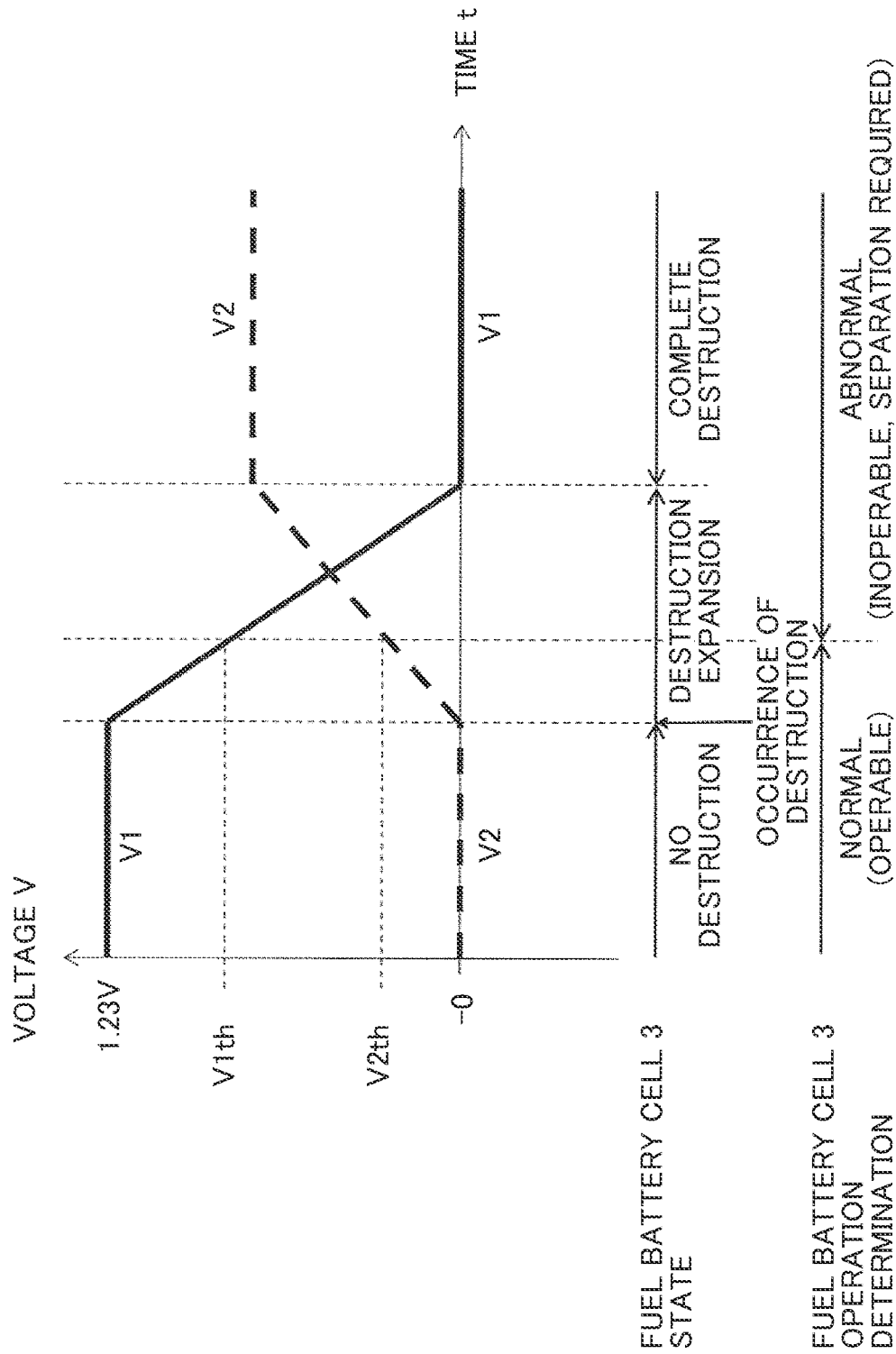
FIG. 4 is a graph showing an example of voltage characteristics of the fuel battery cell 3.

FIG. 4 is a graph showing an example of voltage characteristics of the fuel battery cell 3. For example, in the fuel battery cell 3 in which the electrolyte 11 is formed by YSZ, when hydrogen is used as the fuel gas 40 and oxygen is used as the oxidizing agent 50, an oxidation reaction shown in an equation 1 occurs at the electrode 14, and a reduction reaction represented by an equation 2 occurs at the electrode 15.

$$2H_2 + 2O^{2-} \rightarrow 2H_2O + 4e^- \qquad (1)$$

$$O_2 + 4e^- \rightarrow 2O^{2-} \qquad (2)$$

At this time, the electron $e^-$ flows from the electrode 14 to the electrode 17 via an external load. The oxygen ion $O^{2-}$ is conducted in YSZ from the electrode 17 toward the electrode 14. Consequently, a voltage V1 is generated between the electrode 15 and the electrode 14, and the electrode 15 becomes a high potential (HI side) with respect to the electrode 14. The maximum value of the voltage V1 is 1.23V when the circuit is open.

Assuming the aforementioned film thickness, a laminated film formed of the electrode 14/electrolyte 11/electrode 15 on the opening 10 has a structure in which its thickness is 1 micrometer or less and thin, and the end thereof is supported by the insulator 21 on the substrate 20. Therefore, it is vulnerable to residual stress during processing, thermal stress during operation, the difference in pressure between a fuel electrode gas and an air electrode gas, etc., and may be destroyed when an unexpected change occurs.

When destruction occurs in the opening 10, the space 12 and the space 13 are spatially connected via the destructed portion, and the fuel gas 40 or the oxidizing agent 50 leaks into the other space, thus resulting in a mixed atmosphere. Then, the reactions of the equations 1 and 2 occur simultaneously on the same surface of the electrode 14 or 15, and the voltage V1 and the amount of suppliable current decrease, so that the power P1 is also lowered. At this time, the reactions of the equations 1 and 2 occur even in the electrodes 17 and 18 of the destruction detection unit 5, respectively, and the oxygen partial pressure in the space 12 differs between the vicinity of the electrode 17 and the vicinity of the electrode 18, so that the voltage V2 is generated between the electrodes 17 and 18. The voltage V2 is lower than the voltage V1 during the normal condition, and the electrode 18 becomes higher in potential (HI side) than the electrode 17.

When the destruction at the opening 10 expands, the voltage V1 decreases, while the voltage V2 increases. When the complete destruction is reached, the atmospheres of the spaces 12 and 13 are made stable and the voltages V1 and V2 are also stabilized. At this time, a threshold voltage V1*th* and a threshold voltage V2*th* are respectively set with respect to the voltages V1 and V2. For example, when the voltage V1 is in the range of V1$th$ or more and the voltage V2 is in the range of V2$th$ or less, the fuel battery cell 3 is determined to be normal (operable). When it is other than the case, the fuel battery cell 3 is determined to be abnormal (inoperable). When it is determined to be abnormal, the fuel battery cell 3 is separated as described later.

The difference between the voltages V1 and V2 may be used in determining the abnormality of the fuel battery cell 3. For example, when the difference is greater than or equal to the threshold value, it is determined to be normal, and when the difference is less than or equal to the threshold value, it is determined to be abnormal. By using the difference, even if in-phase noise is mixed in the voltage measuring part 81 or 82, it can be canceled, so that erroneous determination can be prevented and the accuracy of determination is improved. The difference may be obtained by calculation by means of the calculation part 83, or may be obtained on the circuit by connecting a difference circuit to any terminal of the calculation part 83.

Figure 5:
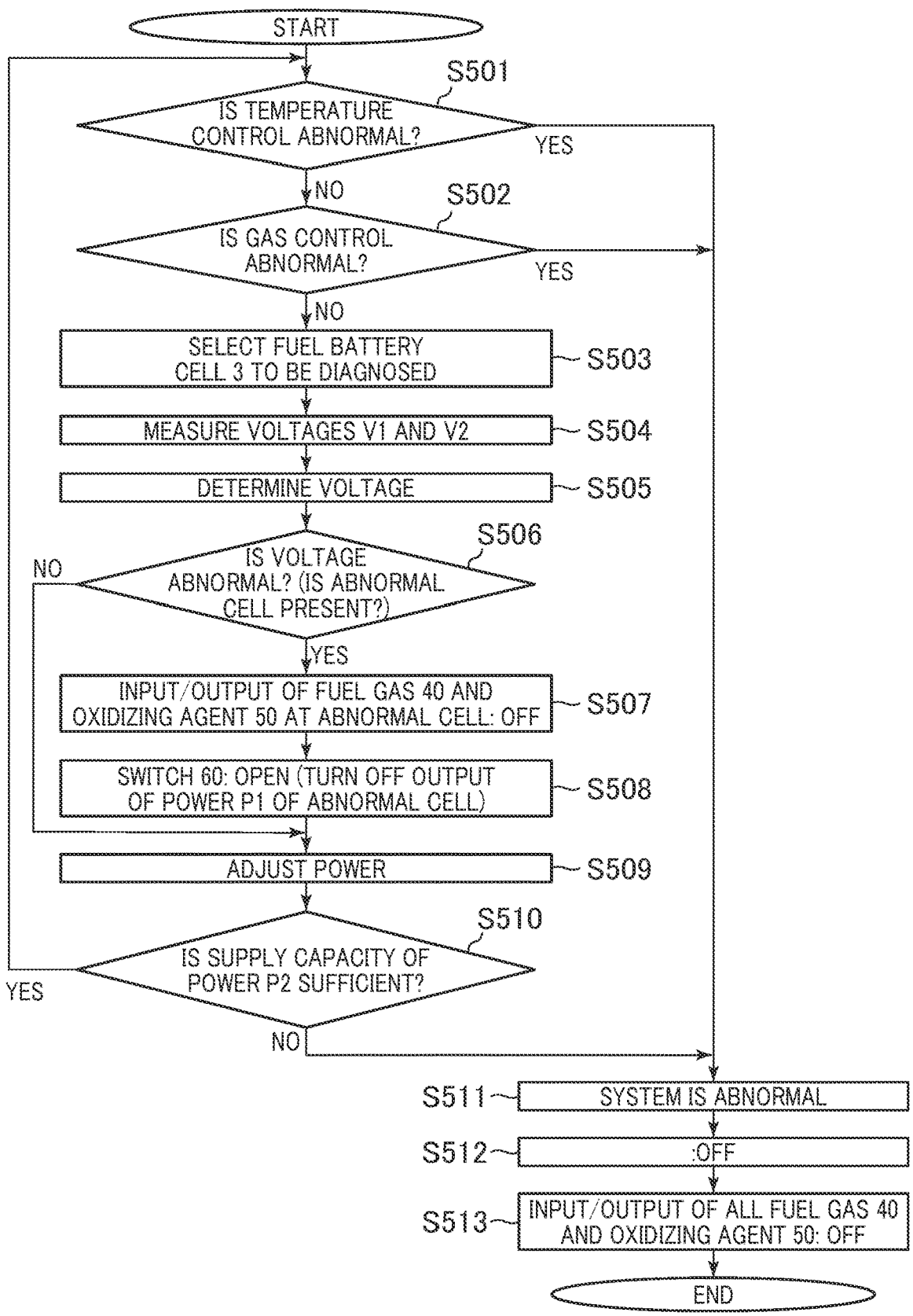
FIG. 5 is an example of a flowchart for describing the operation of the fuel battery system 1.

FIG. 5 is an example of a flowchart describing the operation of the fuel battery system 1. The present flowchart can be implemented by the calculation part 83. Each Step of FIG. 5 will be described below.

(FIG. 5: Steps S501 and S502)

During the normal operation, the temperature control part 86 heats the fuel battery cell 3 with the heater 70 and holds a constant operating temperature while monitoring the temperature with the thermometer 71. The gas control part 84 controls the valves 41, 44, 51, and 54 to supply the fuel gas 40 to the space 12 of the fuel battery cell 3 and the oxidizing agent 50 to the space 13. If there is an abnormality in temperature control (S501) or gas control (S502), the flowchart skips to Step S511. If there is no abnormality in the temperature and gas, the flowchart proceeds to Step S503.

(FIG. 5: Steps S503 to S505)

The calculation part 83 selects the fuel battery cell 3 to be diagnosed (S503). The calculation part 83 measures the voltage V1 of the selected fuel battery cell 3 by the voltage measuring part 81, and measures the voltage V2 by the voltage measuring part 82 (S504). The calculation part 83 uses the voltages V1 and V2 to determine whether or not the fuel battery cell 3 is normal (whether or not the fuel gas 40 or the oxidizing agent 50 is leaking) (S505).

(FIG. 5: Step S505: Supplement)

The calculation part 83 is capable of determining according to any of the following whether or not the fuel battery cell 3 is normal. (a) When V1<V1$th$ or V2≥V2$th$, it is determined to be abnormal. (b) When V1−V2 becomes less than the threshold value, it is determined to be abnormal. (c) When V1 is stable at 0 and the time equal to or more than the threshold value elapses, or when V2 is stable at a value exceeding 0 and the time equal to or more than the threshold value elapses, it is determined to be abnormal.

(FIG. 5: Steps S506 to S508)

When the abnormality is determined in S505 (S506: Yes), the calculation part 83 closes the switch 60 by the power control part 85 and separates the abnormal fuel battery cell 3 from the fuel battery system 1 (S507 and S508). The output of the power P1 of the abnormal cell is stopped (S508) by opening the switch 60, and the supply of the fuel gas 40 and the oxidizing agent 50 is stopped (S507) by closing the valves 41, 44, 51, and 54, thus resulting in carrying out these Steps.

(FIG. 5: Steps S509 and S510)

The calculation part 83 adjusts the output power by the power adjusting unit 110 (S509). The power adjusting unit 110 adjusts the voltage and the amount of suppliable current in response to a change in the power supply state due to the occurrence of the abnormal fuel battery cell 3 or a change in the state of the load 200. If the supply capacity of the power P2 is sufficient (S510: Yes), the power P2 is continuously supplied to the load 200, and the flowchart returns to S501 to maintain the normal operation. When the supply capacity of the power P2 becomes insufficient due to a large number of destroyed fuel battery cells 3 or the like (S510: No), the flowchart proceeds to Step S511.

(FIG. 5: Step S509: Supplement)

The power adjusting unit 110 can adjust the output power by means such as a booster circuit or power supply from another power source. The means for power adjustment is not limited, and it is sufficient that the load 200 can supply the required power.

(FIG. 5: Steps S511 to S513)

The calculation part 83 determines that the fuel battery system 1 is abnormal (S511). The calculation part 83 stops the operation of the fuel battery system 1 by stopping the supply of the power P2 (S512) and stopping the input/output of all the fuel gas 40 and oxidizing agent 50 (S513).

First Embodiment: Summary

The fuel battery system 1 according to the first embodiment is formed by electrically insulating the destruction detection unit 5 comprised of the electrode 17/electrolyte 111/electrode 18 from directly above the opening 10 which is the power generation portion. By insulating the destruction detection unit 5 from the power generation portion, V2 is not generated during the normal operation, and V2 independent of V1 is generated during gas leakage. Therefore, the gas leak can be detected by monitoring V2. Since V2 is a voltage generated by the destruction detection unit 5 at the time of gas leakage by means of the same mechanism as during the normal power generation, the destruction detection unit 5 can be constituted by the same configuration as the portion that monitors V1. Thus, it is not necessary to form a sensing unit having a configuration different from that of the power generation portion for the destruction detection unit 5, and it is not necessary to supply energy to the destruction detection unit 5. That is, the reliability of the fuel battery system 1 can be improved, the fuel battery cell 3 can be miniaturized, and further, the energy consumption for the destruction detection unit 5 can be suppressed.

On the other hand, when a sensing unit such as a pressure gauge or a flow meter is built in the fuel battery cell 3 instead of the destruction detection unit 5, it is not easy to set the operating temperature to 300 degrees or higher, and the size of the fuel battery cell 3 also increases. Further, a circuit for controlling the sensing unit and converting an output signal is also required, and the size and energy are required separately. The present first embodiment exerts a technical effect more advantageous than the prior art in that these problems in the prior art are solved.

Second Embodiment

In a second embodiment of the present invention, description will be made about a configuration example in which power generation efficiency is improved by suppressing the influence of the fuel gas 40 or the oxidizing agent 50 on the electrolyte 11 to prevent an unintended power generation operation from occurring. Since other configurations are similar to those in the first embodiment, the points of difference will be mainly described below.

Figure 6:
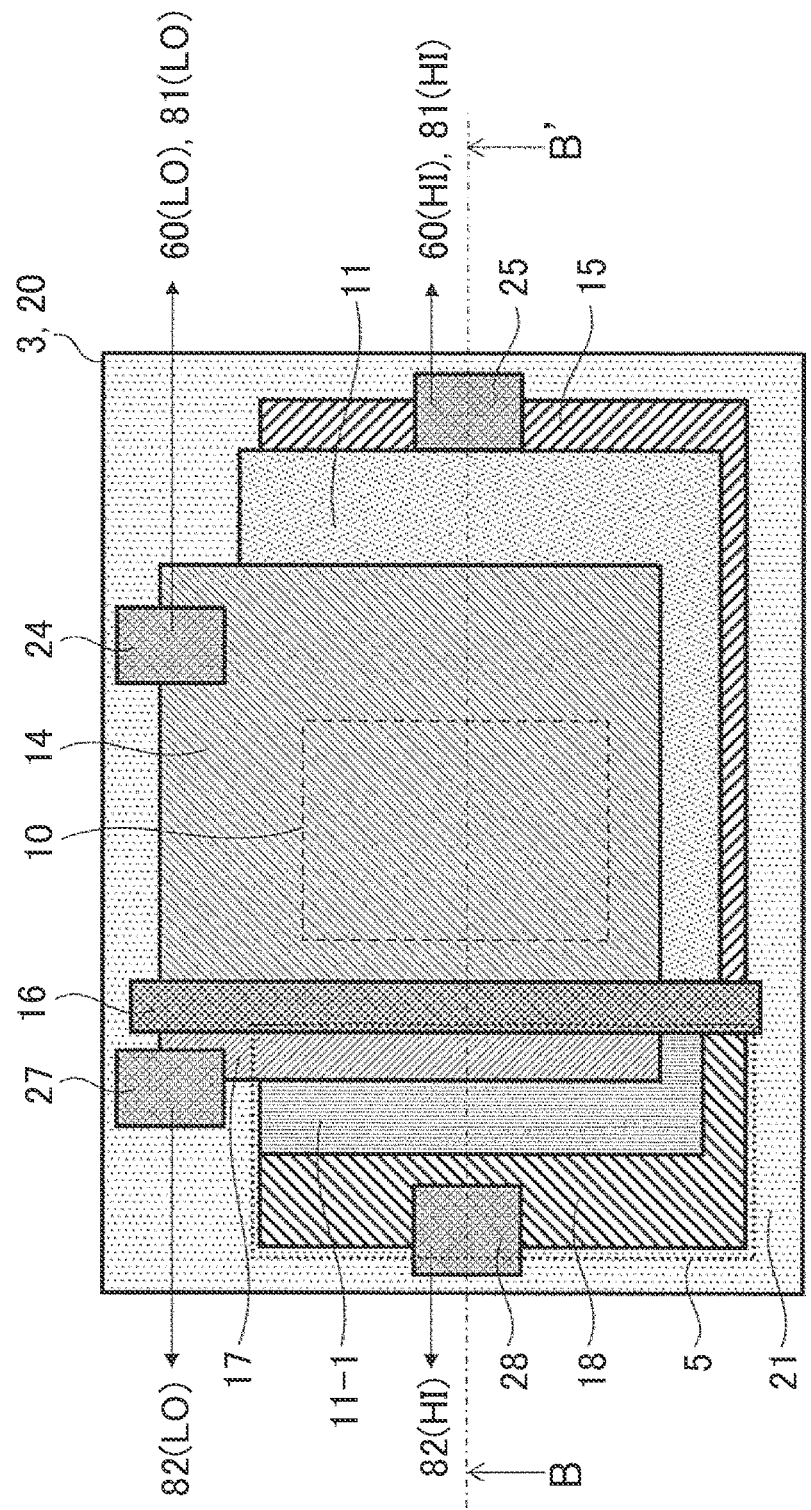
FIG. 6 is a plan view of a fuel battery cell 3 according to a second embodiment.

FIG. 6 is a plan view of a fuel battery cell 3 according to the present second embodiment. In the present second embodiment, the surface where the electrolyte 11 and the space 12 are in contact with each other is covered with an insulator 31. The reason for this will be described later.

Figure 7:
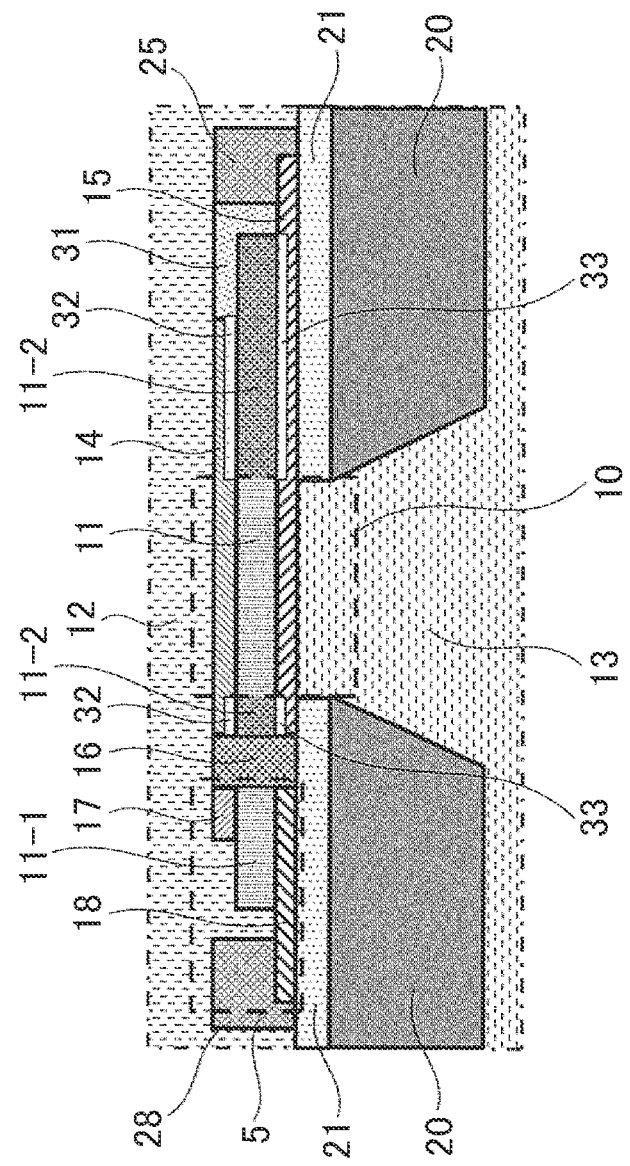
FIG. 7 is a cross-sectional view taken along line B-B' of FIG. 6.

FIG. 7 is a cross-sectional view taken along line B-B' of FIG. 6. In order to improve the power generation efficiency of the fuel battery cell 3, it is desirable that the portion of the electrolyte 11 (electrolyte 11-2 in FIG. 7) being not directly above the opening 10 does not come into contact with the fuel gas 40 (that is, the space 12). This is because extra power generation occurs in a portion other than directly above the opening 10 and hinders power generation at the opening 10. It was therefore decided to cover the electrolyte 11-2 with the insulator 31 (sealing portion).

Similarly, it is desirable that the electrode 14, the electrode 15, or both do not come into contact with the space 12 and the space 13, respectively. Ions of the fuel gas 40 pass through the electrode 14 toward the electrolyte 11-1, or ions of the oxidizing agent 50 pass through the electrode 15 toward the electrolyte 11-1, and extra power generation is similarly generated. Therefore, an insulator 32 is arranged between the electrode 14 and the electrolyte 11-1, or an insulator 33 is arranged between the electrode 15 and the electrolyte 11-1, or both the insulators 32 and 33 are arranged. Thus, the power generation efficiency of the fuel battery cell 3 can be further improved.

According to the configurations shown in FIGS. 6 and 7, in the portion (the electrolyte 11-2 and the portion of the electrodes 14 and 15 being in contact with the electrolyte 11-2) not directly above the opening 10, the same voltage generation as the voltage V2 in the destruction detection unit 5 can be suppressed. Accordingly, the power generation efficiency of the fuel battery cell 3 is improved. Further, the consumption of gas which does not contribute to power generation is suppressed at the portion not directly above the opening 10. Consequently, the power generation efficiency is improved.

Third Embodiment

In a third embodiment of the present invention, description will be made about a configuration example in which at least either the electrode or the electrolyte is shared between the power generation portion (the portion directly above the opening 10) and the destruction detection unit 5. Further, description will be made about a configuration example in which either the LO side electrode pad or the HI side electrode pad is shared. Since other configurations are similar to those of the first and second embodiments, the points of difference will be mainly described below.

Figure 8:
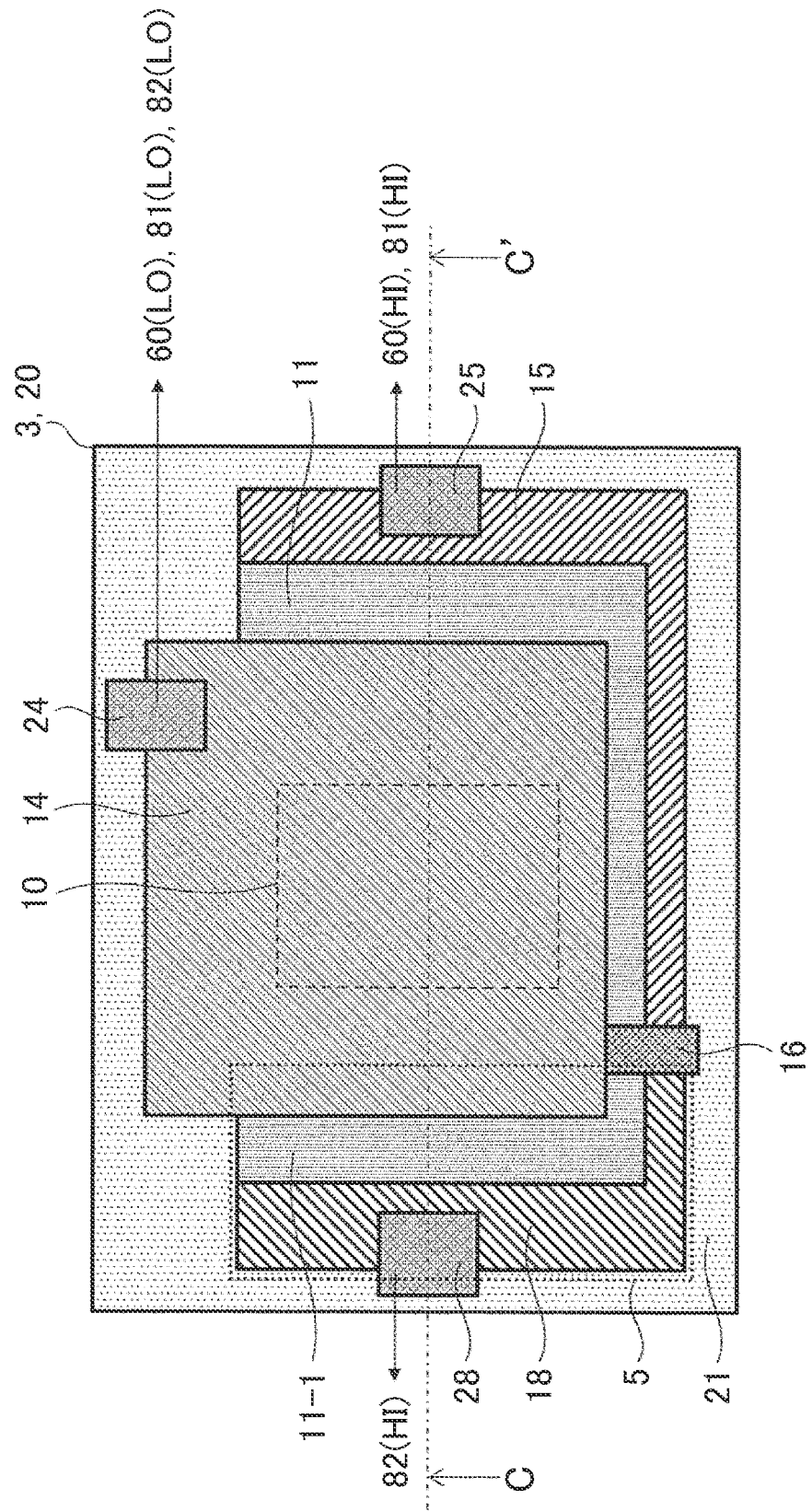
FIG. 8 is a plan view of a fuel battery cell 3 according to a third embodiment.

FIG. 8 is a plan view of a fuel battery cell 3 according to the present third embodiment. In FIG. 8, the electrode 14 is used instead of the electrode 15 constituting the destruction detection unit 5. The electrode pad 27 is replaced by the electrode pad 24. Accordingly, the electrode pad 24 is connected to the LO side of the voltage measuring part 82.

Figure 9:
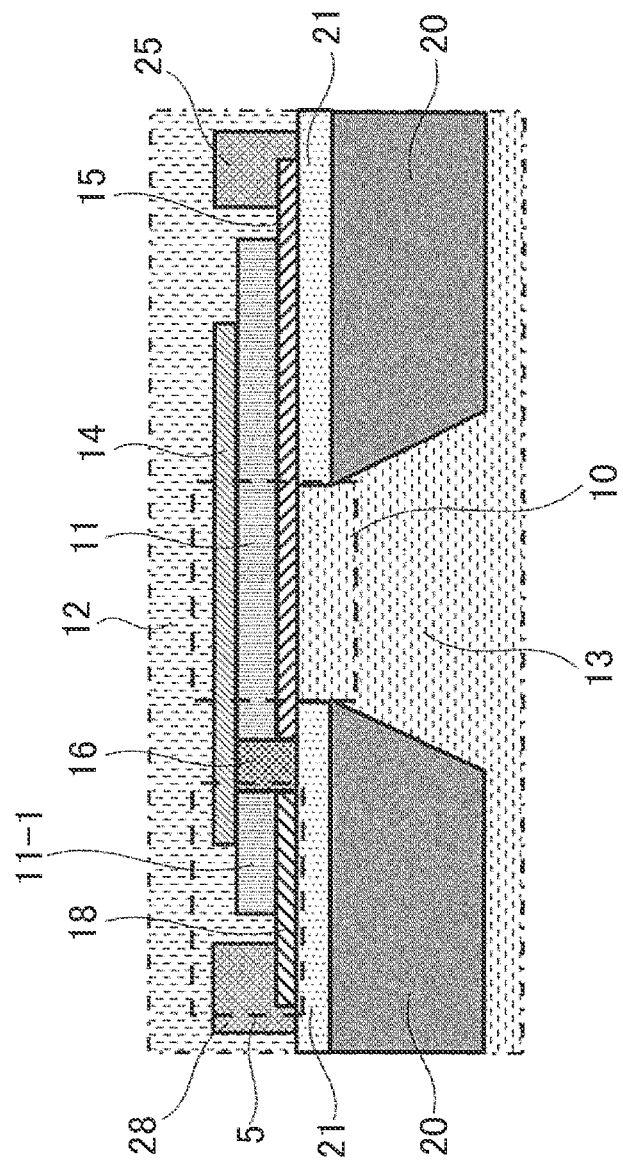
FIG. 9 is a cross-sectional view taken along line C-C' of FIG. 8.

FIG. 9 is a cross-sectional view taken along line C-C' of FIG. 8. The electrode 14 extends so as to cover the upper surface of the electrolyte 11/the upper surface of the insulator 16/the upper surface of the electrolyte 11-1. Consequently, the electrode 14 is used instead of the electrode 15 in the destruction detection unit 5. With such a configuration, the number of electrode pads can be reduced, and the man-hours of the processing process can be reduced.

Figure 10:
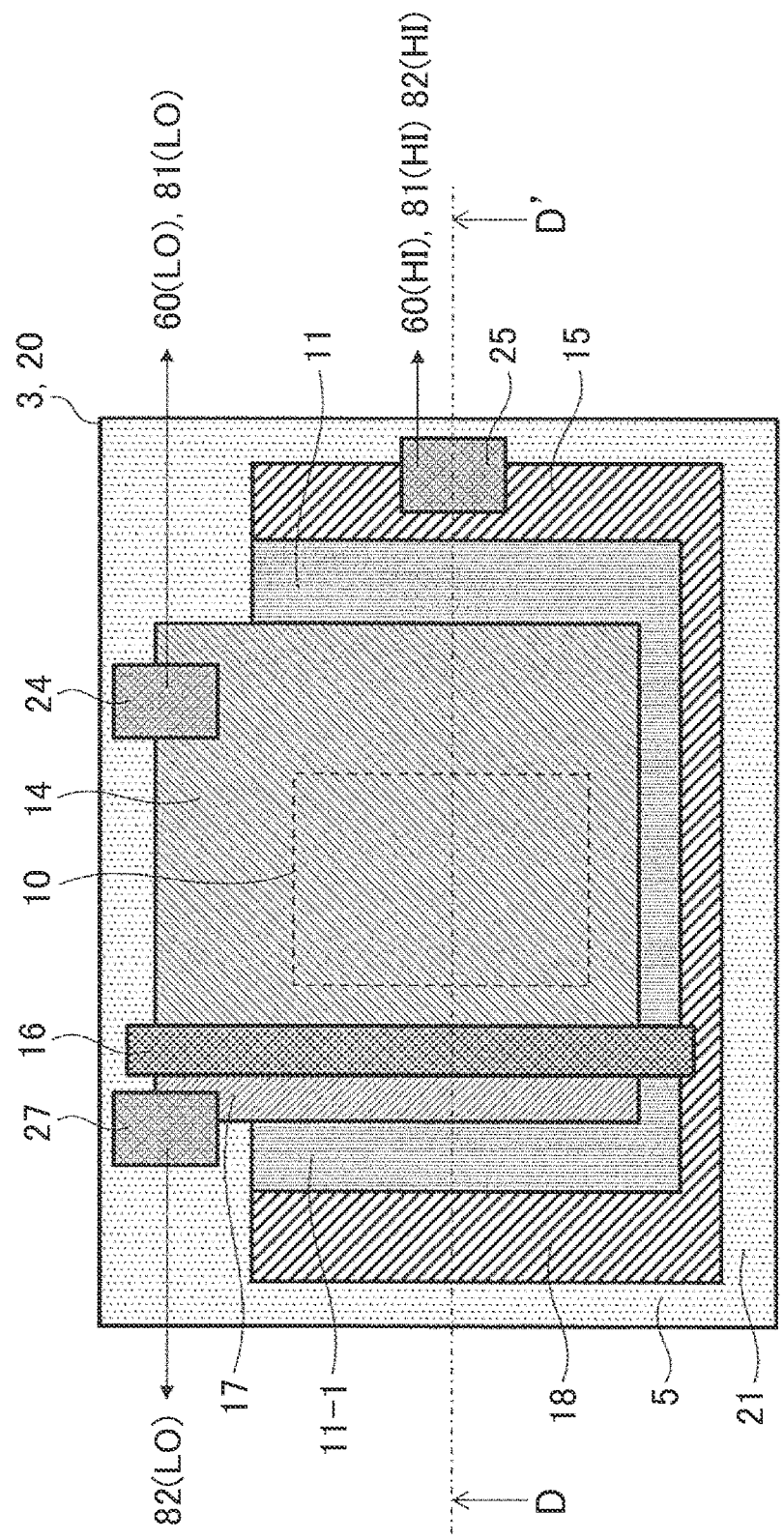
FIG. 10 is a plan view showing a modification of the fuel battery cell 3 according to the third embodiment.

FIG. 10 is a plan view showing a modified example of the fuel battery cell 3 according to the present third embodiment. In FIG. 10, the electrode pad 28 is replaced by the electrode pad 25. Accordingly, the electrode pad 25 is connected to the HI side of the voltage measuring part 82.

Figure 11:
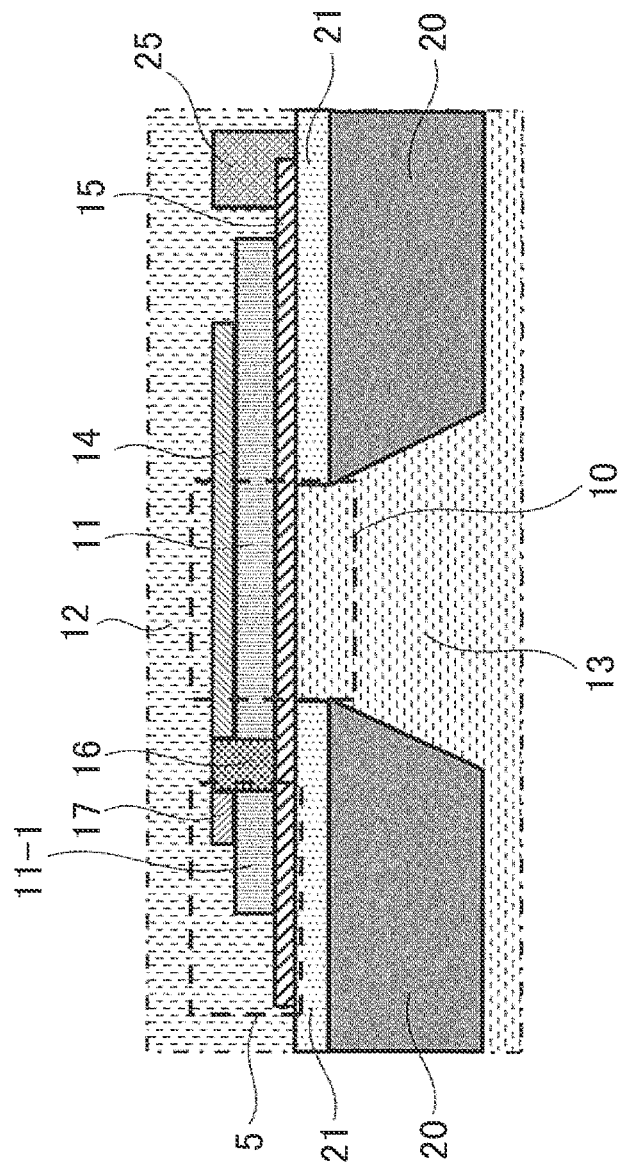
FIG. 11 is a cross-sectional view taken along line D-D' of FIG. 10.

FIG. 11 is a cross-sectional view taken along line D-D' of FIG. 10. The electrode 15 extends so as to cover the lower surface of the electrolyte 11/the lower surface of the insulator 16/the lower surface of the electrolyte 11-1, and thereby the electrode 15 is used instead of the electrode 18 in the destruction detection unit 5. With such a configuration, the number of electrode pads can be reduced, and the man-hours of the processing process can be reduced as in the configurations of FIGS. 8 and 9.

Figure 12:
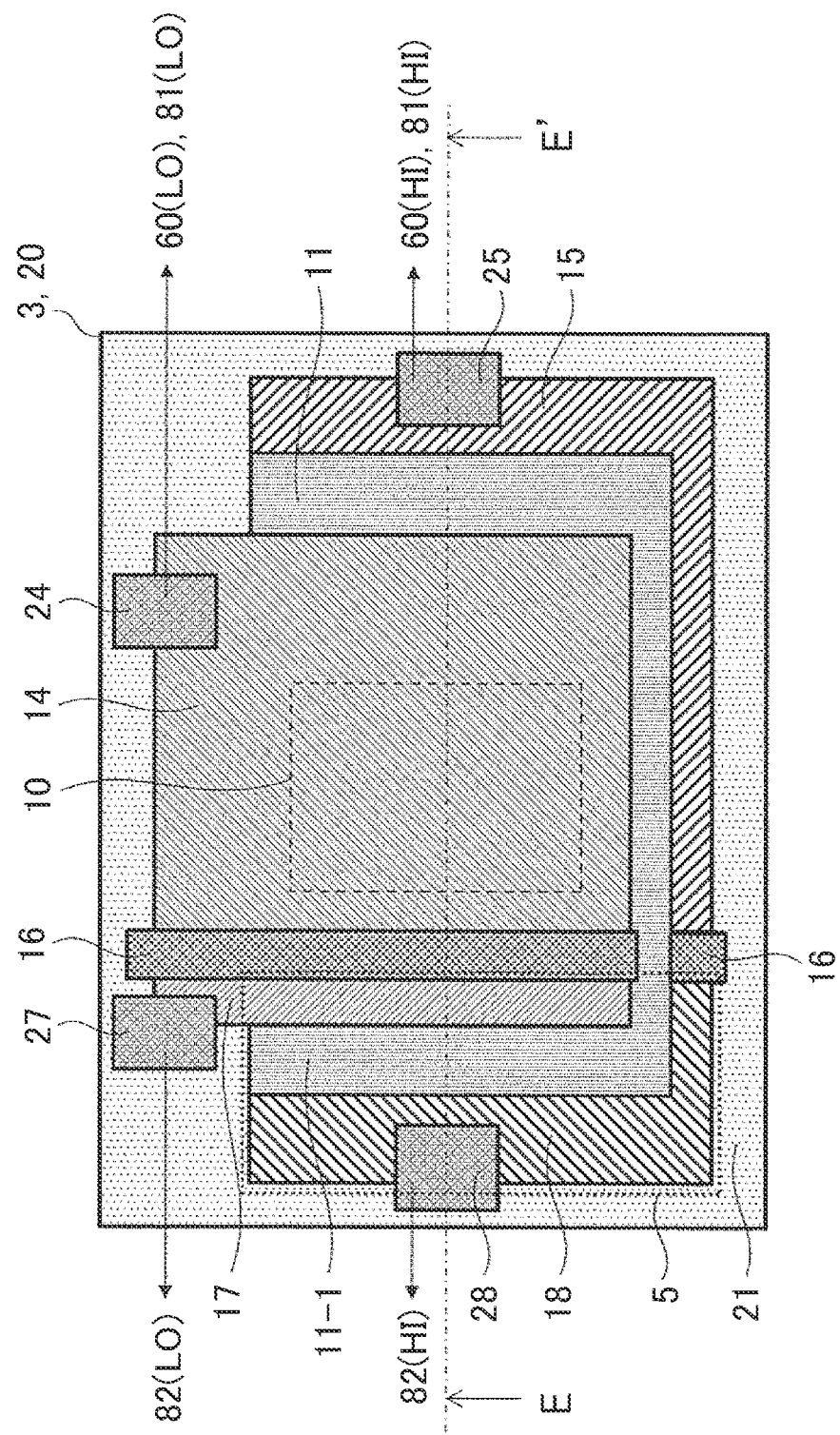
FIG. 12 is a plan view showing a modification of the fuel battery cell 3 according to the third embodiment.

FIG. 12 is a plan view showing a modified example of the fuel battery cell 3 according to the present third embodiment. In FIG. 12, the insulator 16 is formed by being divided into a portion which covers the upper surface of the electrode 14 and a portion which covers the lower surface of the electrolyte 11.

Figure 13:
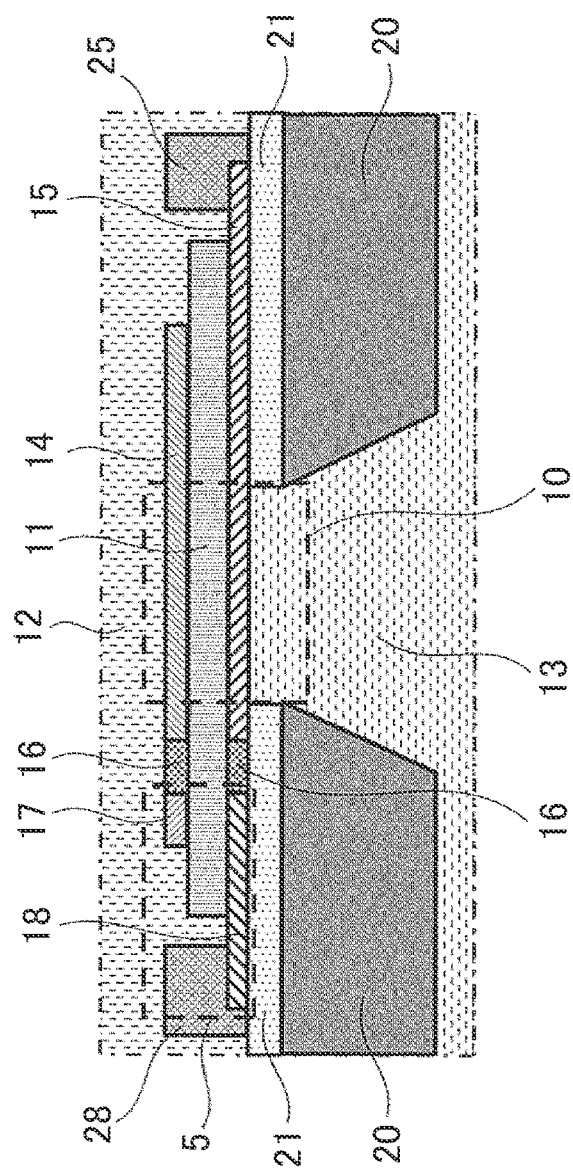
FIG. 13 is a cross-sectional view taken along line E-E' of FIG. 12.

FIG. 13 is a cross-sectional view taken along line E-E' of FIG. 12. The electrolyte 11 extends so as to cover the lower surface of the electrode 14/the lower surface of the insulator 16 on the upper side/the lower surface of the electrode 17 and extends so as to cover the upper surface of the electrode 15/the upper surface of the insulator 16 on the lower side/the upper surface of the electrode 18. Consequently, the electrolyte 11 is used instead of the electrolyte 11-1 in the destruction detection unit 5. With the configurations of FIGS. 12 and 13, the insulator 16 is not required in the layer of the electrolyte 11, and the layer of the electrolyte 11 can be easily formed. For example, the step of patterning/etching the electrolyte 11 for the insulator 16 becomes unnecessary, and the influence on the quality of the electrolyte 11 can also be prevented.

The configurations described in FIGS. 8 to 13 can be combined. For example, in the configurations of FIGS. 12 and 13, the electrode 14 may be used instead of the electrode 17 (that is, the configurations of FIGS. 8 and 9 are used together). In the configurations of FIGS. 12 and 13, the electrode 15 may be used instead of the electrode 18 (that is, the configurations of FIGS. 10 and 11 are used together).

Fourth Embodiment

Figure 14:
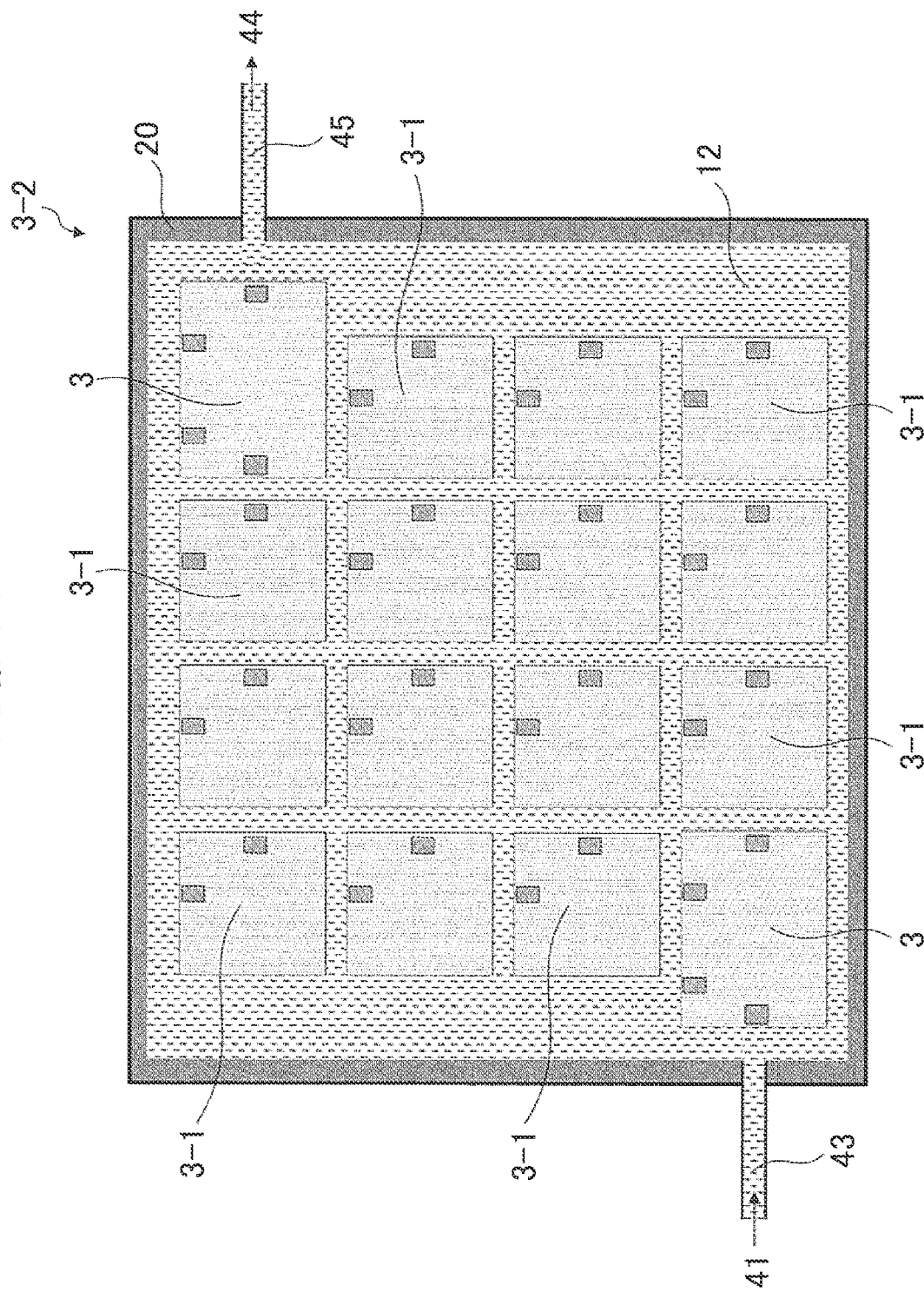
FIG. 14 is a plan view of a fuel battery module 3-2 according to a fourth embodiment.

FIG. 14 is a plan view of a fuel battery module 3-2 according to a fourth embodiment of the present invention. The fuel battery module 3-2 is a module in which a fuel battery cell 3 having a destruction detection unit 5 and a fuel battery cell 3-1 having no destruction detection unit 5 are arranged in an array form. The fuel battery module 3-2 includes a valve 41/flow path 43 supplying a fuel gas 40 to a space 12 and a valve 44/flow path 45 discharging the fuel gas 40 from the space 12. An inlet and an outlet for an oxidizing agent 50 can be provided similarly in a space 13 as well. The arrangement of the fuel battery cells 3 and 3-1 will be described later.

Figure 15:
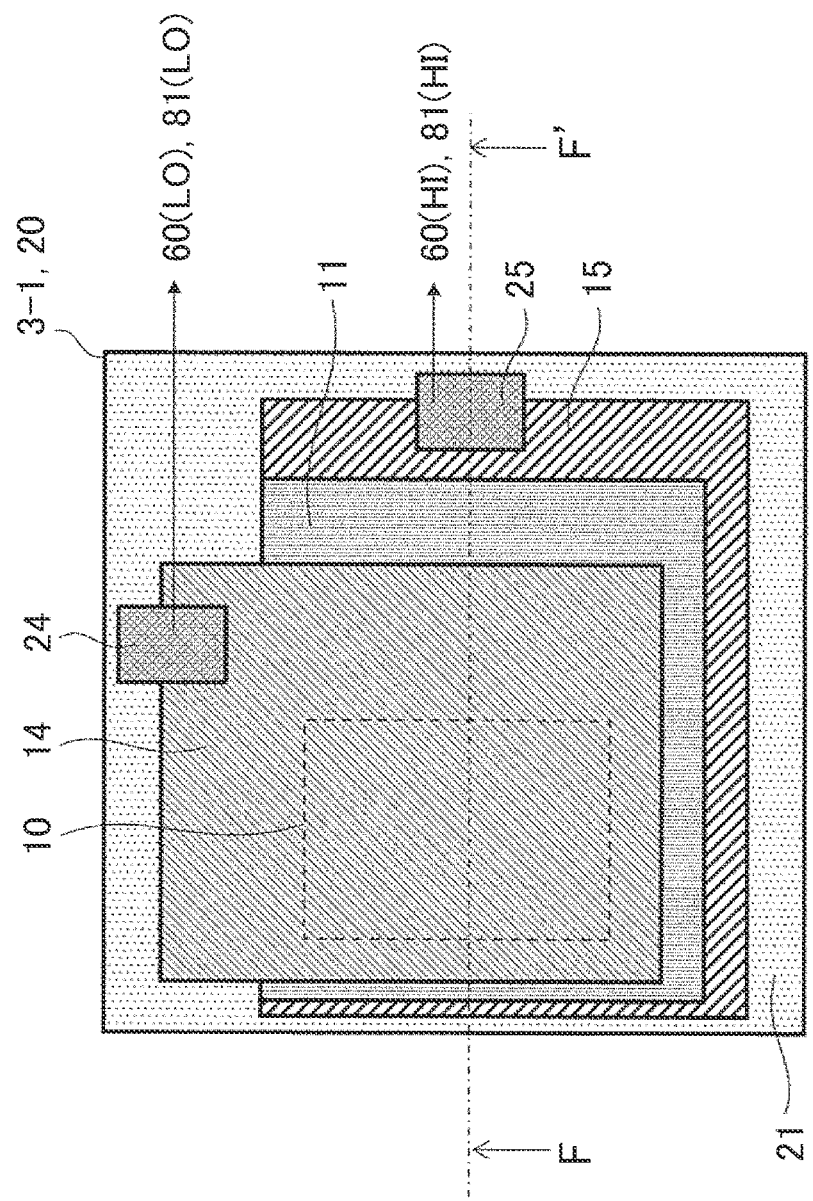
FIG. 15 is a plan view of a fuel battery cell 3-1.

FIG. 15 is a plan view of the fuel battery cell 3-1. Since the fuel battery cell 3-1 does not have the destruction detection unit 5, it has no insulator 16/electrode pad 27/electrode pad 28. Other configurations are similar to those of the fuel battery cell 3.

Figure 16:
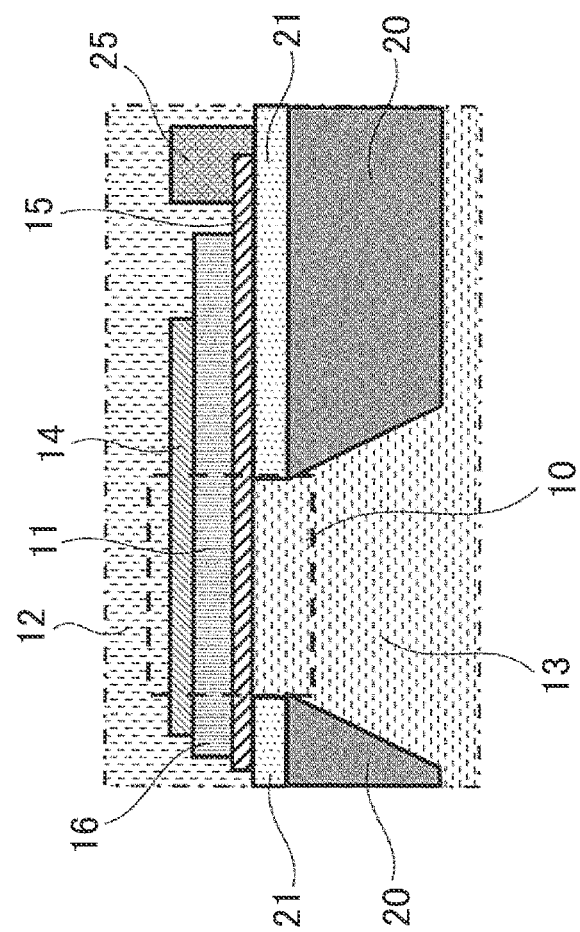
FIG. 16 is a cross-sectional view taken along line F-F' of FIG. 15.

FIG. 16 is a cross-sectional view taken along line F-F' of FIG. 15. The fuel battery cell 3-1 can be manufactured by, for example, the same manufacturing process as a conventional fuel battery cell.

Since the fuel battery cell 3 is formed on a silicon substrate by a semiconductor process, it can be formed in an array form as shown in FIG. 14 by using a large area substrate such as a silicon wafer. Further, when the spaces 12 and 13 are respectively shared among the plurality of fuel battery cells 3 formed on the substrate, at least one destruction detection unit 5 is sufficient, and other fuel battery cells 3-1 do not have to be equipped with the destruction detection unit 5. With such a configuration, a power generation area on the substrate is increased, and power generation efficiency is improved.

By arranging the fuel battery cells 3 (that is, the destruction detection units 5) near the gas input (flow path 43) side and the gas output (flow path 45) side of the space 12, respectively, the destruction detection units 5 are made redundant, and the location of the destroyed opening 10 can be estimated. For example, when a voltage V2 differs between the gas input side and the output side, it can be considered that the destruction has occurred in the opening 10 on the large side of V2. When the voltage V2 is the same on the gas input side and the output side, it can be considered that the destruction has occurred in the plurality of openings 10 as a whole. Alternatively, it can be considered that the gas itself on the input side is already mixed due to the occurrence of the destruction in the fuel battery cell of the other fuel battery stack 2, etc.

FIG. 17 is a configuration diagram of a fuel battery stack 2-1. The fuel battery stack 2-1 is one in which the fuel battery modules 3-2 shown in FIG. 14 are stacked three-dimensionally. Spaces 12 and 13 are provided for each layer and further respectively provided with an introduction port and a discharge port, valves 41, 44, 51, and 54 controlling the input/output of the fuel gas 40 and the oxidizing agent 50 to these, and a switch 60 to open and close the output of power P1. With such a configuration, the voltage V2 of each layer is monitored, and when there is a layer in which the destruction has occurred in the fuel battery cell, that layer is separated. The layer separation is performed by closing the valves 41, 44, 51, and 54 of the layer to shut off the input and output of the fuel gas 40 and the oxidizing agent 50, and opening the switch 60 to shut off the output of the power P1. With such a configuration, an improvement in the power generation capacity of the fuel battery system 1 and an improvement in reliability thereof can be made compatible.

<Regarding Modifications of the Present Invention>

The present invention is not limited to the above-described embodiments, and includes various modifications. For example, the above-described embodiments have been described in detail in order to explain the present invention in an easy-to-understand manner, and are not necessarily limited to those having all the described configurations. Further, it is possible to replace a part of the configuration of one embodiment with the configuration of another embodiment, and it is also possible to add the configuration of another embodiment to the configuration of one embodiment. In addition, it is possible to apply addition/deletion/replacement of another configuration with respect to a part of the configuration of each embodiment.

In the above embodiment, the oxidizing agent 50 may be supplied to the space 12, and the fuel gas 40 may be supplied to the space 13. In this case, the polarities of the voltages V1 and V2 are inverted from those described in FIG. 4.

The control unit 80 can also be configured by using hardware such as a circuit device having implemented the function thereof, or can also be configured by executing by an arithmetic device, software having implemented an arithmetic function in regard to the arithmetic function.

LIST OF REFERENCE SIGNS

1 . . . fuel battery system,
2 . . . fuel battery stack,
2-1 . . . fuel battery stack,
3 . . . fuel battery cell,
3-1 . . . fuel battery cell,
3-2 . . . fuel battery module,
5 . . . destruction detection unit,
10 . . . opening,
11 . . . electrolyte,
11-1 . . . electrolyte,
11-2 . . . electrolyte,
12 . . . space,
13 . . . space,
14 . . . electrode,
15 . . . electrode,
16 . . . insulator,
17 . . . electrode,
18 . . . electrode,
20 . . . substrate,
21 . . . insulator,
22 . . . electrode pad,
24 . . . electrode pad,
25 . . . electrode pad,
27 . . . electrode pad,
28 . . . electrode pad,
31 . . . insulator,
32 . . . insulator,
33 . . . insulator,
40 . . . fuel gas,
41 . . . valve,
42 . . . flow path,
43 . . . flow path,
44 . . . valve,
45 . . . flow path,
46 . . . flow path,
50 . . . oxidizing agent,
51 . . . valve,
52 . . . flow path,
53 . . . flow path,
54 . . . valve,
55 . . . flow path,
56 . . . flow path,
60 . . . switch,
70 . . . heater,
71 . . . thermometer,
80 . . . control unit,
81 . . . voltage measuring part,
82 . . . voltage measuring part,
83 . . . calculation part,
84 . . . gas control part,
85 . . . power control part,
86 . . . temperature control part,
110 . . . power adjusting unit,
200 . . . load.

The invention claimed is:

1. A fuel battery cell comprising:
a support substrate having an opening;
a laminated film arranged on the support substrate;
an insulating member that is arranged on the support substrate at a position where the insulating member does not overlap with the opening and separates the laminated film into a first region and a second region that are electrically insulated, wherein the laminated film includes:
a first electrode arranged on the support substrate,
an electrolyte membrane arranged on the first electrode, wherein the electrolyte membrane has a first portion which overlaps the opening on the support substrate, and a second portion that does not overlap the opening on the support substrate, and a second electrode arranged on the electrolyte membrane; and a sealing portion which seals the electrolyte membrane so as not to come into contact with outside air, wherein the second portion is in contact with the first electrode through a first insulating film and the second portion is in contact with the second electrode through a second insulating film, and wherein the insulating member separates at least one of the first electrode, the electrolyte membrane, and the second electrode into two electrically insulated regions to thereby electrically insulate between the first region and the second region.

2. The fuel battery cell according to claim 1, further including a first voltage output unit which outputs a potential difference between the first electrode and the second electrode in the first region, and further including a second voltage output unit which outputs a potential difference between the first electrode and the second electrode in the second region.

3. The fuel battery cell according to claim 1, wherein the second electrode electrically connects between the first region and the second region of the electrolyte membrane from which the insulating member is separated.

4. The fuel battery cell according to claim 3, further including a first voltage output unit which outputs a potential difference between the first electrode and the second electrode in the first region, and further including a second voltage output unit which outputs a potential difference between the first electrode and the second electrode in the second region, wherein the first voltage output unit outputs a potential difference between a first electrode pad electrically connected to the first electrode in the first region and a second electrode pad electrically connected to the second electrode in the first region, and wherein the second voltage output unit outputs a potential difference between a third electrode pad electrically connected to the first electrode in the second region and the second electrode pad.

5. The fuel battery cell according to claim 1, wherein the first electrode electrically connects between the first region and the second region of the electrolyte membrane from which the insulating member is separated.

6. The fuel battery cell according to claim 5, further including a first voltage output unit which outputs a potential difference between the first electrode and the second electrode in the first region, and further including a second voltage output unit which outputs a potential difference between the first electrode and the second electrode in the second region, wherein the first voltage output unit outputs a potential difference between a first electrode pad electrically connected to the first electrode in the first region and a second electrode pad electrically connected to the second electrode in the first region, and wherein the second voltage output unit outputs a potential difference between a third electrode pad electrically connected to the second electrode in the second region and the first electrode pad.

7. The fuel battery cell according to claim 1, wherein the electrolyte membrane electrically is connected between the first region and the second region of the first electrode from which the insulating member is separated, and wherein the electrolyte membrane electrically is connected between the first region and the second region of the second electrode from which the insulating member is separated.

8. The fuel battery cell according to claim 1, wherein the electrolyte membrane is formed by using a solid oxide.

9. The fuel battery cell according to claim 1, wherein the thickness of the laminated film is 1 micrometer or less.

10. A fuel battery system comprising:

a fuel battery cell; and a control unit which controls operation of the fuel battery cell, wherein the fuel battery cell includes:

a support substrate having an opening, a laminated film arranged on the support substrate, and an insulating member that is arranged on the support substrate at a position where the insulating member does not overlap with the opening and separates the laminated film into a first region and a second region that are electrically insulated, wherein the laminated film includes:

a first electrode arranged on the support substrate, an electrolyte membrane arranged on the first electrode, wherein the electrolyte membrane has a first portion which overlaps the opening on the support substrate, and a second portion that does not overlap the opening on the support substrate, and a second electrode arranged on the electrolyte membrane, and a sealing portion which seals the electrolyte membrane so as not to come into contact with outside air, wherein the second portion is in contact with the first electrode through a first insulating film and the second portion is in contact with the second electrode through a second insulating film, wherein the insulating member separates at least one of the first electrode, the electrolyte membrane, and the second electrode into two electrically insulated regions to thereby electrically insulate between the first region and the second region, wherein the control unit is configured to:

monitor a potential difference between the first electrode and the second electrode in the second region to thereby detect whether or not a fuel gas supplied to the fuel battery cell has leaked, and in response to a leak being detected, stop a supply of the fuel gas to the fuel battery cell and separate a power generation output of the fuel battery cell where the leak occurs from a power generation output of other fuel battery cells.

11. The fuel battery system according to claim 10, wherein the control unit monitors a first potential difference between the first electrode and the second electrode in the first region and a second potential difference between the first electrode and the second electrode in the second region, and wherein the control unit further detects whether or not the leak has occurred, based on whether or not the difference between the first potential difference and the second potential difference reaches less than a threshold value.

12. The fuel battery system according to claim 10, including a first cell as the fuel battery cell, and
further including a second cell which is not provided with the insulating member.

13. The fuel battery system according to claim 12, further including an inlet which introduces the fuel gas and an outlet which discharges the fuel gas, and
further including a third cell as the fuel battery cell,
wherein the distance between the first cell and the inlet is shorter than the distance between the third cell and the inlet, and
wherein the distance between the third cell and the outlet is shorter than the distance between the first cell and the outlet.

* * * * *